United States Patent [19]
Crayford et al.

[11] Patent Number: 5,550,803
[45] Date of Patent: Aug. 27, 1996

[54] METHOD AND SYSTEM FOR INCREASING NETWORK INFORMATION CARRIED IN A DATA PACKET VIA PACKET TAGGING

[75] Inventors: Ian S. Crayford, San Jose; William Lo, Santa Clara, both of Calif.

[73] Assignee: Advanced Micro Devices, Inc., Sunnyvale, Calif.

[21] Appl. No.: 406,085

[22] Filed: Mar. 17, 1995

[51] Int. Cl.$^6$ .................................................. H04J 3/14
[52] U.S. Cl. ........................... 370/13; 370/94.1; 370/109; 370/111
[58] Field of Search ................................ 370/13, 13.1, 17, 370/56, 60, 85.13, 94.1, 94.3, 102, 110.1, 111, 109

[56] References Cited

U.S. PATENT DOCUMENTS 4,633,464 12/1986 Anderson ................................ 370/111
5,285,199 2/1994 Pocek ........................................ 370/13
5,287,343 2/1994 Nakamura et al. ..................... 370/94.3
5,355,366 10/1994 Li et al. ................................... 370/111

*Primary Examiner*—Benedict V. Safourek
*Attorney, Agent, or Firm*—Benman Collins & Sawyer

[57] ABSTRACT

A method and system for providing statistical network information carried in a data packet being transmitted on a network. The method includes the steps of receiving a data packet having a data portion on a repeater and transferring the data portion to a management unit. The method further includes the step of appending statistical information to the data portion during an inter-packet gap period. The apparatus for providing statistical information in a data packet on a network includes a repeater mechanism, a management unit mechanism, and a packet tagging circuit. The repeater mechanism receives a data packet having a data portion, the management unit mechanism determines statistical information based on the data packet, and the packet tagging circuit appends information to the data portion of the data packet during an inter-packet gap period.

42 Claims, 7 Drawing Sheets

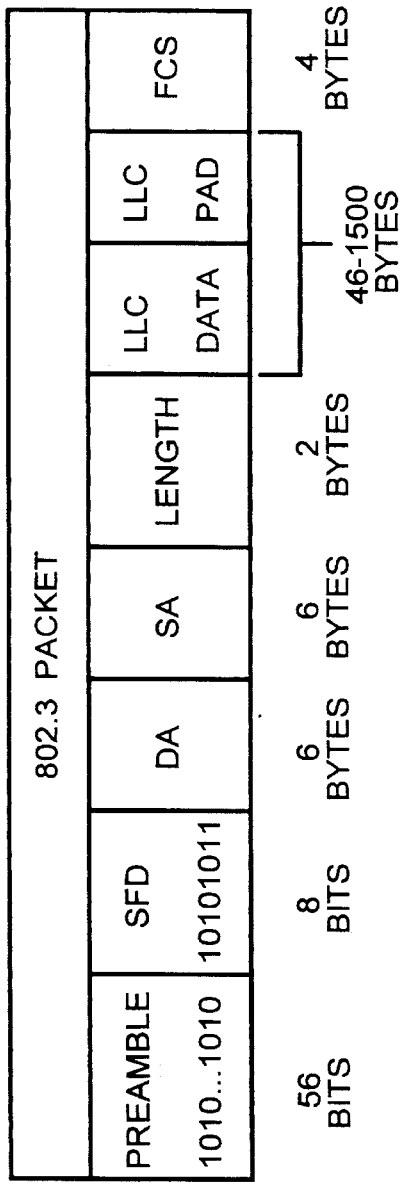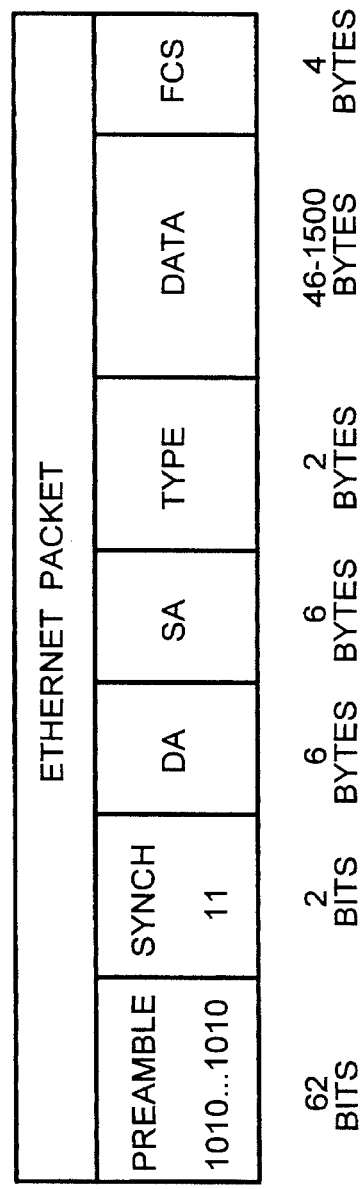

METHOD AND SYSTEM FOR INCREASING NETWORK INFORMATION CARRIED IN A DATA PACKET VIA PACKET TAGGING

FIELD OF THE INVENTION

The present invention relates generally to the statistical information carried within a data packet on a local area network and more particularly to optimizing the statistical information carried in a modified version of the data packet.

CROSS REFERENCE TO RELATED APPLICATIONS

"Expandable Repeater" (Vijeh, Staab), U.S. Pat. No. 5,265,123.

"Programmable Address Mapping Matrix for Secure Networks" (Lo, Crayford), U.S. patent application Ser. No. 08/406,081, filed Dec. 30, 1994.

"A System and Method for Efficiently Monitoring Information in a Network having a Plurality of Repeaters" (Lo, Crayford), Ser. No. 08/406,081.

BACKGROUND OF THE INVENTION

In traditional Ethernet (802.3 10BASE5) and Cheapernet (802.3 10BASE2) a coaxial cable provides the linear bus to which all nodes are connected. Signalling is achieved using a current sink technique with a center conductor used for the signal and a shield used as a ground reference. All devices are connected to the coaxial bus, and therefore all devices will receive the transmission of a single device. Twisted pair Ethernet (802.3 10BASE-T) utilizes standard voice grade telephone cable, employing differential signalling on separate transmit and receive pairs of the cables. 10BASE-T provides only a point-to-point communication capability and requires additional active elements, e.g., a repeater, to provide a point-to-multipoint local area network (LAN) capability. An Ethernet network system typically includes a number of interconnected cable segments. A repeater is used to interconnect two or more cable segments. Each cable segment may be one of a variety of cable types, for example, coaxial or twisted pair. The repeater performs signal amplitude and timing restoration on an incoming bitstream and repeats the bitstream to all of the ports connected to the repeater. By repeating data to all ports, the repeater acts as a logical coaxial cable so that any node connected to the network will see another node's transmission.

Traditionally, repeaters allow wired coaxial Ethernet to extend a network's physical distance limit. For twisted pair Ethernet, if more than two nodes are required to provide connectivity, the IEEE 802.3 10BASE-T Standard mandates the use of a repeater. Although the physical signalling on the coaxial and twisted pair cabling differs, the functionality of the repeater for either is identical as is the frame or packet format used to pass messages through the repeater between the participating nodes on the network.

FIGS. 1 and 2 show the format for an IEEE 802.3 Standard compliant packet and an Ethernet packet, respectively. The frame commences with a preamble sequence which is an alternating (1,0) pattern. The preamble provides a single frequency on the network, in this case 5 Mega Hertz (MHz) at the start of each packet, which allows a receiver to lock to the incoming bitstream. The preamble sequence is then followed by a start of frame indicating that the data portion of the message will follow. Either a start of frame delimiter (802.3) or synch sequence (Ethernet) is used to delineate the start of the data portion of the message. A primary difference as shown is the start of frame delimiter (SFD). For 802.3, the SFD is defined as a byte that has a "1,0, 1,0, 1,0, 1,1" pattern whereas the start frame (synch) of Ethernet is a "1,1" sequence. However, in both cases the preamble plus the start of frame indication is a total of 64 bits long.

Regarding packet size, both 802.3 and Ethernet standards specify that a packet must be in the range of 64–1518 bytes. However, the actual data field in the 802.3 system is permitted to be smaller than the 46 byte value that ensures a minimum packet size. The Media Access Control sub-layer appends pad characters to a Logical Link Control (LLC) data field before sending data over the network to compensate for a smaller data field. The Ethernet standard assumes that the upper layer ensures that the minimum data field is 46 bytes before passing data to a Media Access Control (MAC) sub-layer and the existence of these appended characters is unknown to the MAC device.

The 802.3 standard also uses a length field which indicates the number of data bytes that are in the LLC data and pad fields only. The high order byte of the length field is transmitted first with the least significant bit (LSB) of each byte transmitted first. Ethernet, on the other hand, uses a type field in the same two bytes of the frame to identify the message protocol type.

The data field contains the actual packet data that is being transferred and is between 46 to 1500 bytes in length. Since valid Ethernet type fields are always assigned outside of the valid maximum 802.3 packet length size, both 802.3 and Ethernet packets can coexist on the same network.

The LLC function fragments data into block sizes suitable for transmission over the network. Data bytes are transmitted sequentially with the LSB of each byte transmitted first. Following the LLC data/pad fields, the frame check sequence (FCS) is a four-byte field that contains the cyclic redundancy check (CRC) for the entire frame. The CRC is computed by the transmitting station on the destination address, source address, length/type, and data field and is appended as the last four bytes of the frame. The same CRC algorithm is used by the receiving station to compute the CRC value for the frame as it is received. The value computed at the receiver is compared with the value appended by the transmit station to provide an error detection mechanism for corrupted data. The CRC bits within the FCS are transmitted in the order most significant bit to least significant bit.

Two other fields of the frame are the destination address (DA) and the source address (SA) for the frame. Both addresses are 48 bit values transmitted LSB first. A receiving MAC determines if a match exists between the receiver's node address and the address within the DA field. Only a node indicated as matching should attempt to receive the remainder of the packet.

Three types of destination addressing are supported by the 802.3 and Ethernet standards.

1. Individual. The DA field contains an individual and unique address assigned to one node on the network.

2. Multicast. If the first bit of the DA field is set this indicates that the group address is being used. The group of nodes that will be addressed is determined by a higher layer function but in general the intent is to transmit a message between a logically similar subset of nodes on the network.

3. Broadcast. The broadcast is a special form of multicast address where the DA field is set to all 1s. The address is reserved, and all nodes on the network must be capable of receiving a broadcast message.

The source address field is supplied by the transmitting MAC. The transmitting MAC inserts a sender's node address into the SA field as the frame is transmitted to indicate the node as the originating station of the packet. The receiving MAC is not required to take action based on the SA field.

Network management, analysis and/or diagnostic equipment is typically concerned with the information in a packet that determines statistical information for the network. Statistical information includes what type of packets are on the network, e.g., what type of protocols are being used on the network, the packet sender, the packet receiver, and distribution of the lengths of the packets being transferred on the network to identify how well a network is being utilized. The statistical information typically comprises approximately the first forty bytes of the data packets being sent on the network.

Unfortunately, not all of the information desired is contained in a data packet. One example of information particularly desirable for analysis of network function is the location of each end station or node of the network and each repeater port with which each end station is associated. With the location information, a "network map" could be formed, for example, to identify each node and port on the network. Although the information needed to form a "network map" is usually contained within the repeater, the management MAC associated with the repeater does not normally receive this information because the information is not carried in the data packet transmitted to the MAC. Typically, attempts to extract the information from the repeater require the addition of complicated and inefficient control hardware and software to the repeater system. Unfortunately, the additional control mechanisms usually increase the expense of the repeater system beyond practical limits for most situations.

A need exists to transmit additional statistical information to a management MAC within a repeater MAC that is efficient and direct and does not compromise the integrity of the network and the data packets transferred on the network. The present invention addresses these needs.

SUMMARY OF THE INVENTION

The present invention presents a method and system for appending statistical information to a data packet being transmitted on a network.

In one aspect of the present invention, a method for providing statistical network information carried in a data packet includes the steps of receiving a data packet having a data portion on a repeater and transferring the data portion to a management unit. The method further includes the step of appending statistical information to the data portion during an inter-packet gap period while the data packet is transferred to the management unit. The statistical information includes a repeater identification value, a port identification value, and a generated frame check sequence (FCS). Other statistics include packet length, whether the packet has been compressed, and whether the packet is a multicast or broadcast packet. The method also includes the step of providing a control signal indicating network activity during the step of appending.

In another aspect of the present invention, an apparatus for providing statistical network information carried in a data packet includes a repeater mechanism, a management unit mechanism, and a packet tagging circuit. The repeater mechanism receives a data packet having a data portion, the management unit mechanism determines statistical information based on the data packet, and the packet tagging circuit appends information to the data portion of the data packet during an inter-packet gap period while the data packet is transmitted to the management unit mechanism. The apparatus further includes an FCS generator circuit that generates a valid FCS for the modified data packet. The packet tagging circuit further appends the valid FCS to the modified data packet. The apparatus further includes a controller mechanism for indicating a status of the packet tagging circuit, and a start of frame delimiter (SFD) circuit for identifying an SFD of the data packet.

In a further aspect of the present invention, a method for providing statistical network information carried in a data packet includes the steps of receiving a data packet having a data portion on one repeater, transferring the data portion to a management unit, appending statistical information to the data portion as the data packet is transferred to the management unit, and outputting a first and a second control signal. The step of outputting a first control signal activates the steps of transferring and appending and deactivates these steps when a collision signal is received. The step of outputting a second control signal indicates a status of transmission activity during the steps of transferring and appending and indicates transmission activity until the collision signal is no longer received.

An additional aspect of the present invention is a circuit for enhancing network statistical information to a repeater. The repeater includes a repeater front end for receiving a data packet and a management unit coupled to the repeater front end. The enhancing circuit includes a packet tagging mechanism for appending statistical information to the data packet during an inter-packet gap period, and a validation mechanism to provide an indication that the appended data packet is valid.

With the present invention, increased network analysis may be performed. The additional data transmitted with the data packet to a management MAC provides easier access to network statistics for better monitoring of the network's activity. The information appended to the data packet also allows increased analysis of the level of activity on each repeater and each port of each repeater in the network. The appended data can also provide a "network map" for the location of each end station coupled to each port on each repeater in the network. Further, the increase in information offers better administration capabilities for the network. Additionally, the flexibility of the present invention in allowing as little or as much statistical information to be appended to a data packet makes it readily suitable for any network.

These and other advantage of the present invention will be readily apparent from the following discussion of the present invention.

BRIEF DESCRIPTION OF THE DRAWINGS

FIG. 1 shows the format for an 802.3 packet.

FIG. 2 shows the format for an Ethernet packet.

DETAILED DESCRIPTION OF THE INVENTION

The present invention is directed toward a system for providing statistical network information to a management unit in a repeater based network. The following description is presented to enable one of ordinary skill in the art to make and use the invention and is provided in the context of a patent application and its requirements. Various modifications to the preferred embodiment and the generic principles and features described herein will be readily apparent to those skilled in the art.

A system in accordance with the present invention modifies a data packet received at a repeater in a network as the data packet is transferred from the repeater to a management unit. The management unit preferably is the only location to receive the appended data. The repeater in addition repeats the data packet in a normal manner to all other appropriate locations on the network. The modified data packet provided to the management unit includes statistical information that would ordinarily not be transmitted with a data packet. The information includes identification of the repeater port from which a data packet has been received as well as identification of the repeater chip or circuit receiving the data packet. Other statistics include packet length, a CRC value, whether the packet has been compressed, whether the packet is a multicast or broadcast packet, and whether the packet is valid. The statistical information is "tagged" onto or appended to the end of a data packet.

In an efficient and direct manner, the additional data is appropriately added during an inter-packet gap period. The inter-packet gap period, for purposes of this discussion, is considered the time interval between the transmission of succeeding data packets on the network, i.e., the period between the end of transmission of one data packet and the start of transmission of a second data packet. Typically, the inter-packet gap period in an 802.3/Ethernet system is a minimum of 96 bits or 12 bytes long. Of course, the inter-packet gap period could be longer depending upon the network traffic, or shorter due to a phenomenon referred to as inter-packet gap shrinkage, well known to those skilled in the art.

Figures 3, 7:
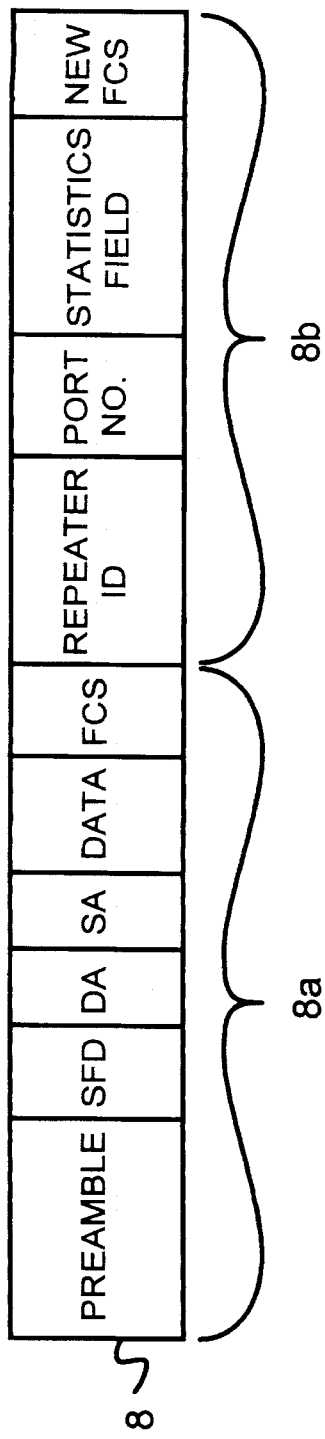
FIG. 3 illustrates a data packet with appended data formed in accordance with the present invention.
FIG. 7 illustrates a packet tagging circuit in accordance with the present invention.

FIG. 3 illustrates a packet 8 including tagged data formed in accordance with the present invention as set forth in the following discussion and presented in greater detail with reference to FIGS. 4–7. As shown in FIG. 3, a tagged data packet 8 includes data portion 8a from an original data packet as well as tagged data portion 8b. The tagged data 8b includes, for example, fields for a repeater ID (identification), a port number, other statistics, and a new FCS. Any or all of these fields may be included as tagged data depending upon the needs of a particular system. Also, the order of the additional fields with the exception of the new FCS field is arbitrary and may be changed without departing from the present invention. Preferably, the additional data fields tagged onto a data packet are added during the period of an inter-packet gap period, so as not to disrupt a normal flow of packets across the network. More preferably, a time period of about two-thirds of a typical inter-packet gap period, e.g., 4–8 bytes, has been found to work well as a period for tagging data.

It should be appreciated that although the original data portion 8a is shown with all the fields from preamble to FCS of the originally transmitted data packet, a compressed data packet could also be formed and transmitted as the original data 8a without departing from the spirit or scope of the present invention. A method and system for performing data packet compression that would be suitable with the present invention is described in a co-pending U.S. Patent Application entitled "A System and Method for Efficiently Monitoring Information in a Network having a Plurality of Repeaters", filed Mar. 14, 1993 on behalf of the inventors of the present invention and assigned to the assignee of the present invention. Of course, for a compressed data packet, the period for tagging data would be longer, since the inter-packet gap observed by the management MAC will be increased, and preferably tagging would commence before the start of the inter-packet gap period.

Figure 4:
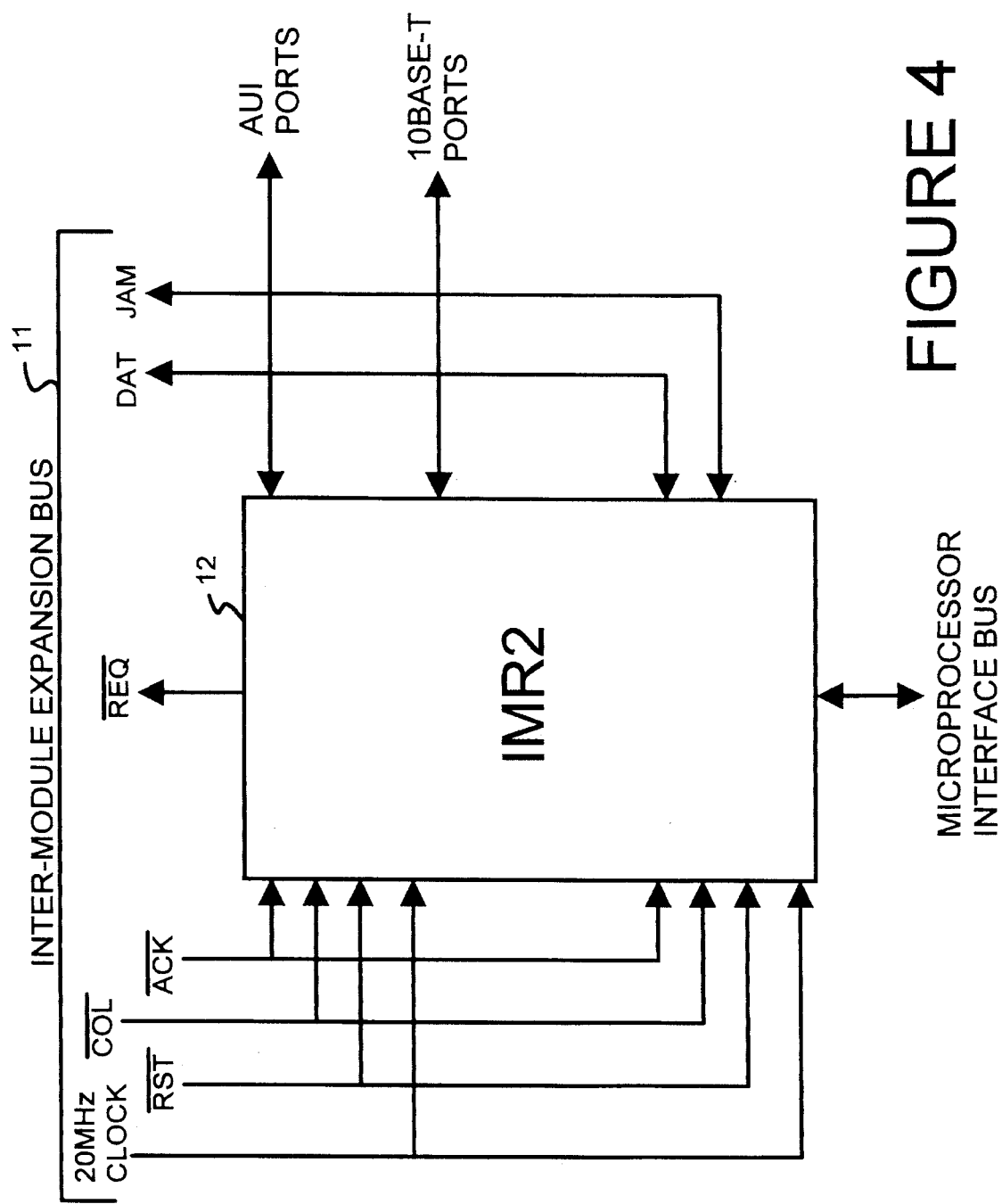
FIG. 4 is a simplified block diagram of an Integrated Multiport Repeater (IMR2) in accordance with the present invention.

Referring now to FIG. 4, the present invention comprises an Integrated Multiport Repeater (IMR2) device 12 in a preferred embodiment. The IMR2 device provides the basic repeater function, performing signal amplitude and timing restoration, incorporating individual 10BASE-T ports, and Attachment Unit Interface (AUI) ports. The AUI ports allow connection of the 10BASE-T ports to an existing coaxial wired Ethernet/Cheapernet network. The IMR2 device also provides an inter-module expansion bus 11, which allows multiple IMR2 devices to be cascaded together, and still be treated as a single repeater.

The inter-module expansion bus 11 comprises the signals $\overline{\text{RST}}$ (Reset), 20 MHz clk (20 MHz clock), $\overline{\text{REQ}}$ (Request), $\overline{\text{ACK}}$ (Acknowledge), $\overline{\text{COL}}$ (Collision), DAT (Data) and JAM (Jam). The operation of this type of expansion scheme is described in U.S. Pat. No. 07/556,046, entitled Expandable Repeater and assigned to the assignee of the present application.

Note that the data passed across this expansion bus on the DAT line is a restored version of the incoming packet data received when a single port of the IMR2 device (or group of devices) is active. This means that the preamble field of the packet which is passed across the DAT pin is restored, substantially reducing or eliminating preamble shrinkage effects due to the start up delays of the receive circuits.

In addition, the IMR2 device 12 also has a management port, to allow configuration and monitoring of the operational state of the repeater.

The IMR2 12 device further provides monitoring for all network activity detected by the IMR2 device. The IMR2 12 collects statistics based on the type of network activity, and stores this information internally as registers which can be accessed by an external host device, such as a microprocessor using a management port. The host typically uses the data collected and stored by the IMR2 12 device to provide network management information, in order to more easily administer the operation and/or fault diagnosis of the network.

The IMR2 12 provides the advantages above described. The following discussion more fully presents the operation of the device. The sizes of the various devices and signals in the following are arbitrary and one of ordinary skill in the art will recognize that many other combinations could be used and still be within the spirit and scope of the present invention.

Figure 5:
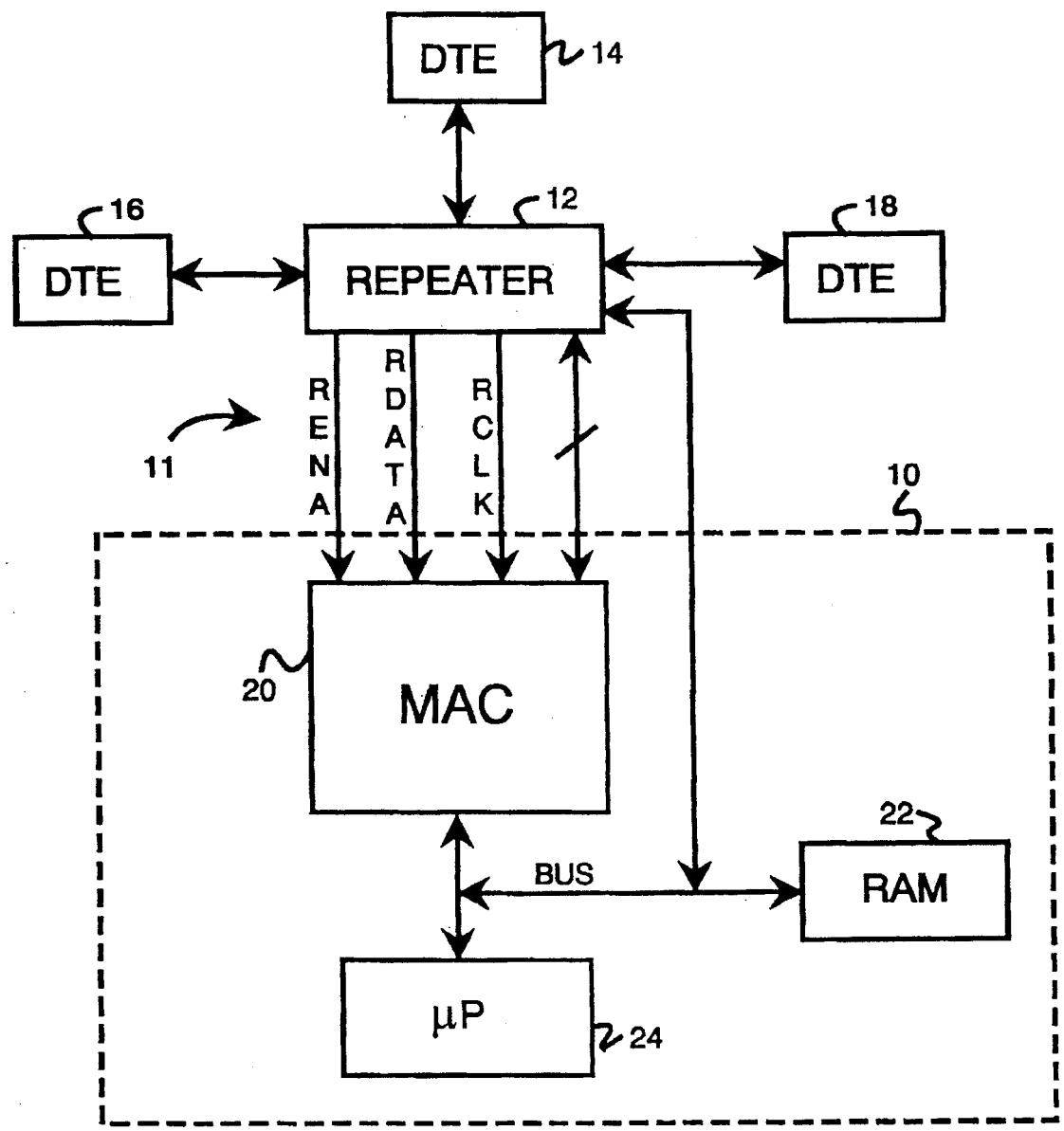
FIG. 5 is a block diagram illustrating a repeater and management unit arrangement in accordance with the present invention.

FIG. 5 presents an overall system configuration in accordance with one aspect of the present invention. The repeater, IMR2 12, is connected with a management unit 10 and, for illustration purposes, three data terminal equipment (DTE), units 14, 16, and 18. Data is transmitted from the DTE units 14, 16, or 18 through repeater 12 and management unit 10 with the management unit 10 typically recording network management information from the data.

The management unit 10 interfaces with the repeater 12 through an expansion bus 11 comprising multiple communication signals, including RENA (receive enable), RDATA (receive data), and RCLK (receive clock) signals. Information received from the repeater, i.e, data in a data packet, is transmitted via the expansion bus 11 to the MAC unit 20 of the management unit 10.

Typically, a MAC unit 20 removes the preamble and SFD portions of a packet and performs error checking routines on the packet. The contents of the frame are usually then transferred to a random access memory (RAM) unit 22 with the MAC 20 writing either the entire frame into the RAM 22, a portion of the frame or none of the frame, unless a collision occurs. When a collision occurs, only a portion of the frame may be written and the MAC 20 may operate to correct any discrepancies resulting from the collision. A microprocessor 24 reads the data stored in the RAM 22 and processes the data to extract statistics concerning the data packet.

Figure 6:
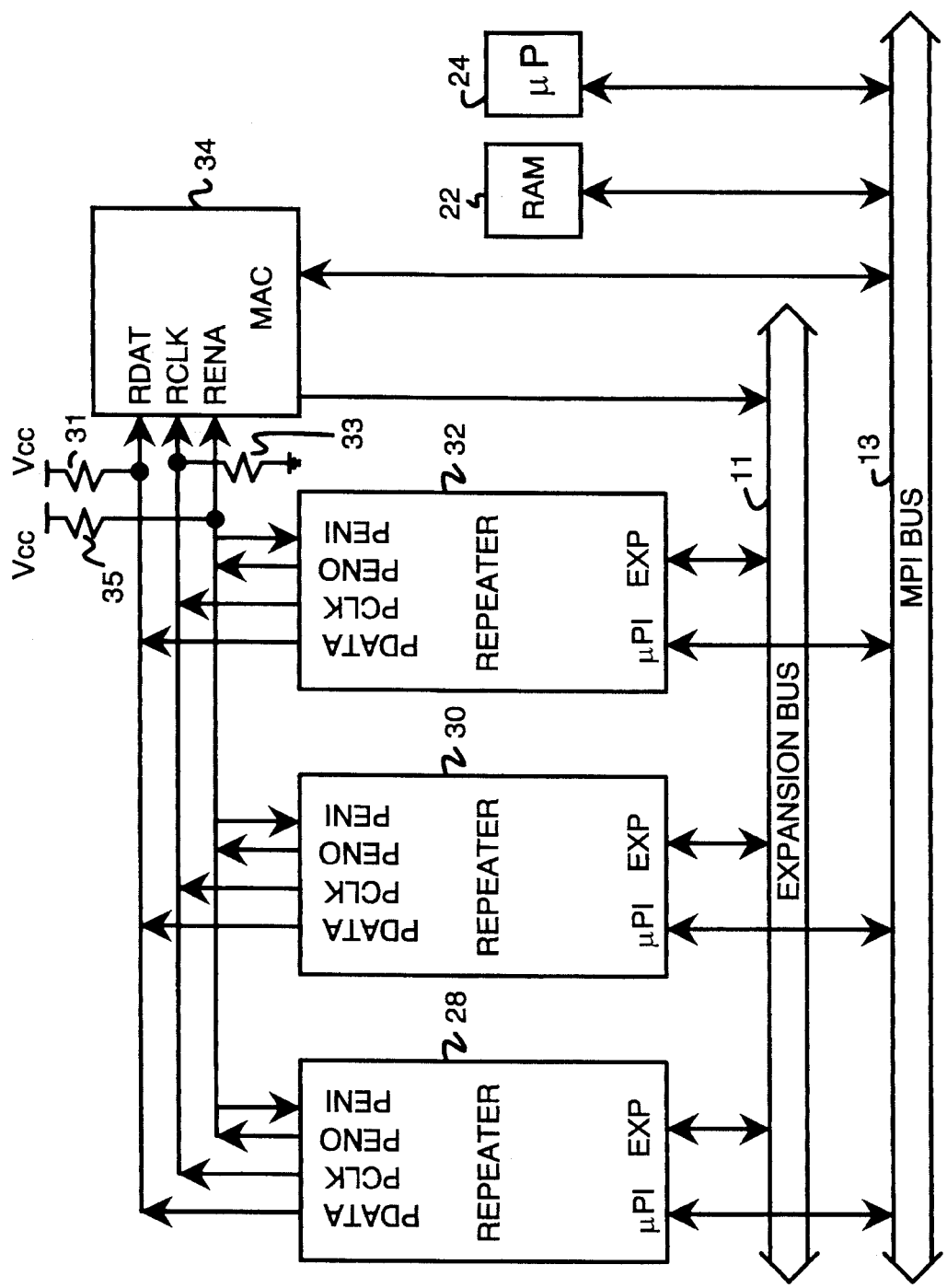
FIG. 6 is a block diagram of a network circuit having a plurality of repeaters and a management unit in accordance with the present invention.
Figure 7A:
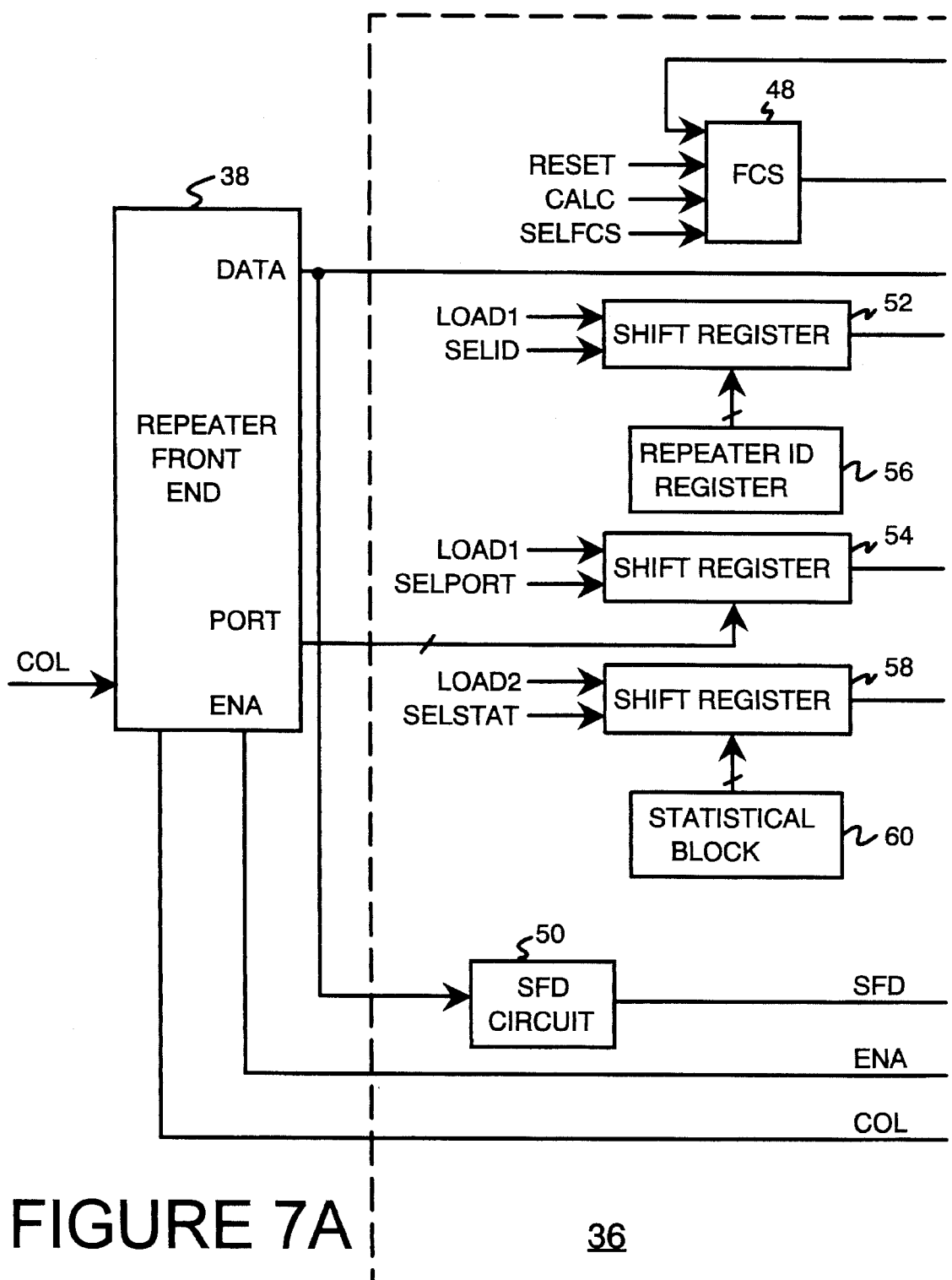
Figure 7B:
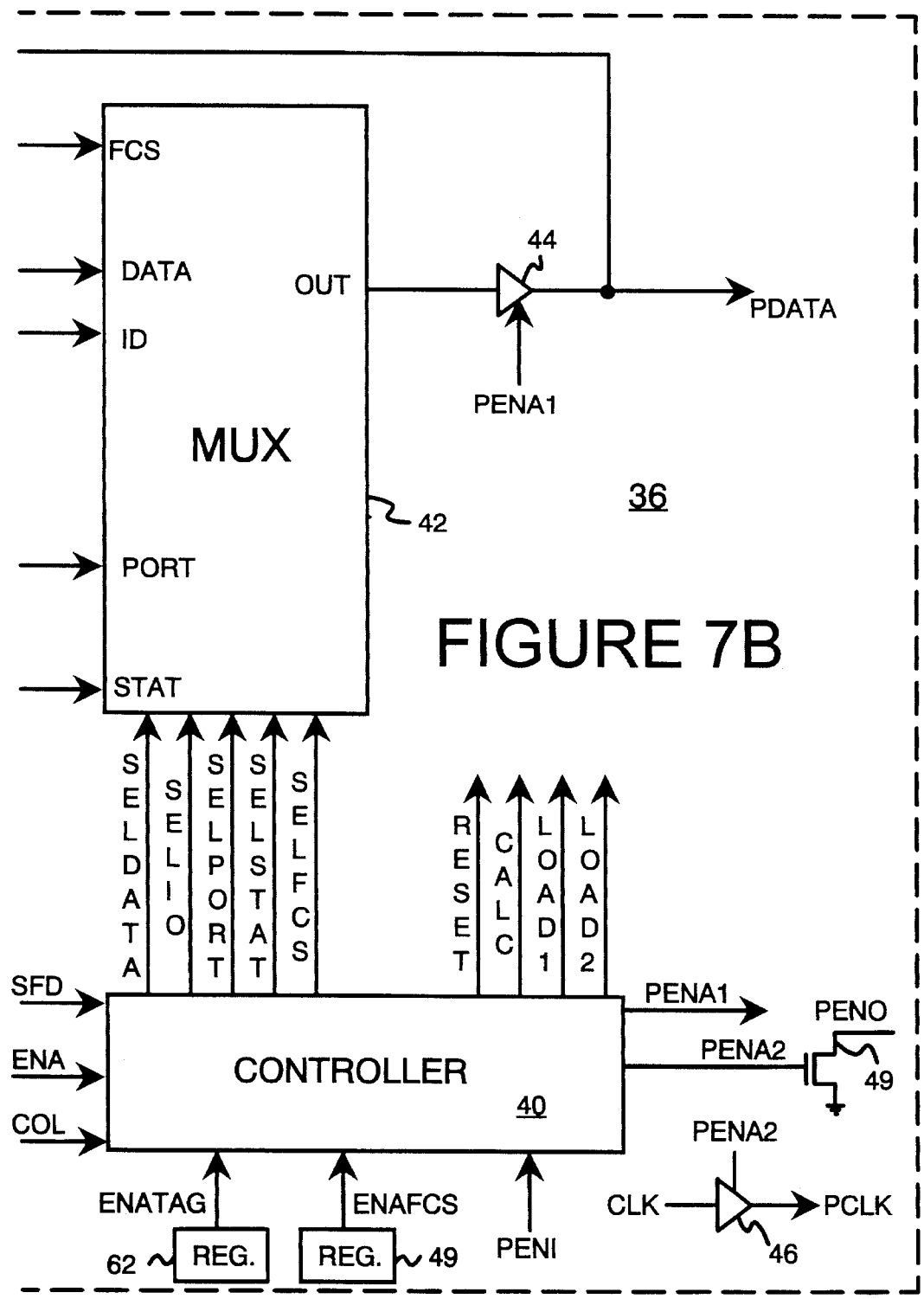

FIG. 6 illustrates a system layout for a logical repeater formed by multiple repeater chips 28, 30, and 32 connected to a single management unit, MAC 34. Using multiple repeater chips increases the number of ports available on the network as is well appreciated by those skilled in the art. The transmit side of MAC 34 is connected to the expansion bus 11 to allow transfer of data to the network. The MAC 34 is also connected to a processor bus 13 to transfer data to and from the microprocessor 24 and RAM 22 as discussed above with reference to FIG. 5. The receive side of the MAC 34 is connected to repeaters 28–32 by the signals PDATA (port data), PCLK (port clock), PENO (port enable output), and PENI (port enable input).

The PDATA and PCLK lines are bussed together with RDAT and RCLK, respectively, of MAC 34. Preferably, PDATA is pulled to a high logic level and PCLK is pulled to a low logic level by resistors 31 and 33 coupled to VCC and ground reference voltages, respectively, to prevent the lines from floating when the circuit is inactive. The sizes of the resistors and the power (VCC) and ground reference voltages are dependent upon the needs of a system, as is well understood by those skilled in the art.

The PENO line is preferably an open-drain signal line coupled to VCC through a pull-up resistor 35 to allow the signal line to be pulled to a high logic level. Although the PENI and PENO lines are shown connected to the same line, they are preferably not provided as one pin on a repeater to allow the PENO signal to be buffered as desired, as is well appreciated by those skilled in the art. The function and control of these signals is discussed in more detail with reference to the FIG. 7.

FIG. 7 presents a packet tagging circuit 36 in accordance with the present invention. The packet tagging circuit 36 is connected with a repeater front end 38 to control the output of the signals PDATA, PENO, PENI, and PCLK and may be used, as desired, in one or more repeater chips in a logical repeater, e.g., repeater chips 28, 30, or 32 (FIG. 6).

When a repeater chip receives a data packet from the network, it asserts an enable signal ENA from the repeater front end 38. The ENA signal is transmitted to a controller 40. A data signal DATA is also transmitted from the repeater front end 38 to a multiplexer (MUX) 42. When the controller 40 receives the ENA signal, a check is made on the status of the PENI signal. The PENI signal indicates the status of the PENO signal (FIG. 6). Suitably, when the PENI signal is at a low logic level, the controller 40 determines that a data packet or tag field is still being transmitted to the management MAC, i.e., the PDATA line is being used.

When the PENI signal is high and the ENA signal is asserted, the controller 40 asserts the SELDATA (select data) signal to the MUX 42 to select the DATA signal input to the MUX 42. The controller 40 also asserts a RESET signal to reset a FCS generator circuit 48. Further asserted by controller 40 are the PENA1 and PENA2 (port enable) signals.

Assertion of PENA1 enables the tri-state drivers 44 and 46 for transmission of the PDATA and PCLK signals, respectively. When PENA1 is at a low logic level, the outputs of PDATA and PCLK are at a high impedance state, as is appreciated by those skilled in the art. The PCLK signal corresponds to a clock (CLK) signal input to the system, and the PDATA signal corresponds to the signal output from the MUX 42.

A high level PENA2 signal turns on a transistor 49, e.g., an n-channel MOSFET, to bring the PENO signal low. A low level PENO signal indicates to the other repeaters in the network that the PDATA line is being used. When PENA2 is at a low logic level, the PENO signal is an open-drain signal pulled high by pull-up resistor 35 (FIG. 6).

Use of a separate PENA2 signal to control the PENO signal, and correspondingly, the PENI signal, provides greater network control. In a single logical repeater which may consist of multiple repeater chips, a first repeater chip may begin receiving data from the network even though a second repeater chip is still transferring tagged data to the management MAC 34 (FIG. 6). In essence, since the DTEs connected to the logical repeater are unaware of the extended length of the packet that is being transferred to the management MAC caused by the appended tag data. In this case, a DTE connected to the first repeater may start its transmission after an inter-packet gap of 96 bit times, but the inter-packet gap observed by the management MAC may become very small, or the subsequent packet may even overlap the tag field of the first packet. In the preferred embodiment of the present invention, the second repeater that is still transferring tagged data to the management MAC ignores the packet being received by the first repeater chip, and the first packet with it's tagged information is transferred correctly to the management MAC. Hence, if the tag field causes excessive inter-packet gap shrinkage, to the point that no inter-packet gap exists, a repeater chip that is transferring tag information will complete the transaction, but will cause the following packet to not be observed by the management MAC. Even though the subsequent packet is not transferred to the management MAC, the PENO signal is held active by the first repeater during the subsequent packet activity, ensuring that the MAC observes network activity and is therefore prevented from transmitting on the network.

This "blinding" of some back-to-back packets can make the statistics captured by the management unit to become inaccurate. In the preferred embodiment, this can be avoided by compressing the original packet data as defined in copending patent application entitled "A System and Method for Efficiently Monitoring Information in a Network Having a Plurality of Repeaters", and reporting fields that do not rely on the completion of the packet (e.g. repeater ID and port ID) before the original packet completes. Alternatively, the size of the tag information field could be reduced (e.g. report fewer statistics) to reduce the shrinkage effects. Note that even though packet overlap can occur at the management MAC, due to inter-packet gap shrinkage caused by the appended tag, this does not affect the normal network (DTE) ports of the repeater, and data is repeated normally to all ports regardless of the "blinding" which may occur at the management MAC.

Proper assertion of the PENA2 signal by the controllers 40 in both the first and second repeater chips ensures that the PENO signal will be maintained at a low level to indicate traffic on the network during the full receptions of both repeaters. By way of example, the PENO signal would be pulled high when the second repeater tagging data finishes transmitting and deasserts the PENA2 signal. The PENO signal properly remains low, however, during the entire transmission of the first repeater by the assertion of the PENA2 signal in the first repeater. Thus, although the second repeater may finish transmitting data before the first repeater, the second repeater would not begin transmitting another data packet to the management MAC until the PENO signal is brought high upon the deassertion of the PENA2 signal in the first repeater. However, normal packet data is correctly repeated to all DTE ports on the repeat. Suitably, proper network functioning is maintained and the packet from the first repeater is not received by the management MAC.

A collision signal COL is also used to provide greater network control. The COL signal is input from the expansion bus 11 (FIG. 4) through the repeater front end 38 to the controller 40. The COL signal suitably indicates that more than a single port has received a data packet at the same time. Preferably, when the COL signal goes high, the controller 40 deasserts the PENA1 signal. A low level PENA1 signal suitably stops the output of the PDATA and PCLK signals, as mentioned above. Further, a high level PENA2 signal is maintained by the controller 40 to keep the PENO signal low in each repeater on the network until the COL signal drops low.

As the DATA signal is transmitted from the repeater front end 38, an SFD detector circuit 50 operates to detect the SFD field in the data packet. The SFD detector 50, e.g., a logic circuit, determines the proper SFD sequence indicator, as is well appreciated by those skilled in the art.

Once the SFD of the data packet is detected by SFD detector circuit 50, an SFD signal is asserted by the SFD detector circuit 50 and transmitted to the controller 40. The controller then asserts a CALC (calculation) signal to the FCS generator circuit 48. When the FCS generator circuit 48 receives the CALC signal from controller 40, the FCS generator circuit 48 is enabled to begin calculation of a new FCS sequence based on the PDATA values being fed back to the FCS generator circuit 48. Completion of the FCS sequence generation occurs when the CALC signal is deasserted by the controller 40.

The FCS generator circuit 48 provides a new FCS sequence for transmission following the addition of data to the data packet. Since the original FCS sequence is not valid once data is tagged onto the data packet, the FCS generator circuit 48 generates a new FCS sequence to attach to the end of the elongated data packet. The attachment of a new FCS sequence permits a valid FCS to be transferred to those MAC units that do not recognize a packet without a valid FCS. Formation of the valid FCS sequence by FCS circuit 48 proceeds by calculating a four byte sequence indicative of the number of bits in the data packet, as is well appreciated by those skilled in the art.

In an alternate embodiment, the controller 40 could be programmed to deactivate the sending of the FCS by the FCS generator circuit 48. Deactivation may be suitably performed by not sending a SELFCS (select FCS) signal, for example. Deactivation would also be suitably performed by storing a programmable control signal ENAFCS (enable FCS) in a register 49 coupled to controller 40. Programmable deactivation of the FCS generator circuit provides greater circuit flexibility and reduced data packet processing time for transfer of data packets to those MACs that do not need to have a valid FCS sequence appended to the packet to accept a data packet.

The controller 40 also asserts a LOAD1 signal upon detection of an assertion of the ENA signal. The LOAD1 signal is coupled to shift registers 52 and 54 and activates the shifting in of the inputs to the shift registers 52 and 54. The outputs of shift registers 52 and 54 are inputs to the MUX 42.

The input of shift register 52 is coupled to the output of a repeater ID register 56. The repeater ID register 56 provided within each repeater chip contains an identification number corresponding to the individual repeater chips from which the data packet is being received. The identification number is a unique value provided for each repeater chip and programmed by the microprocessor 24 (FIG. 5). The length of the repeater identification value is dependent on the system requirements including the number of repeater chips connected to the MAC in the network, as is well understood by those skilled in the art. A one-byte value has been found by the inventors to work well as a repeater ID value.

The input of shift register 54 is coupled to the repeater front end 38 via a PORT signal. The PORT signal contains the port identification number for the repeater chip port connected to the end station that is the source of the data packet. The port identification number is assigned by the repeater chip to the port and in a preferred embodiment, is 4 bits long. Of course, the length of the port identification varies and is dependent on the number of ports in a repeater.

When the ENA signal drops to a low logic level, the original data in the data packet is finished transmitting. The controller then deasserts the SELDATA signal and asserts the SELID (select identification) signal. The SELID signal is an input to the shift register 52, and when asserted, activates the shift register 52 to output the data contained in the shift register 52, i.e., the repeater identification value. The SELID signal is also a selection input into MUX 42, and when asserted, selects the output of the shift register 52 as the output from the MUX 42 on the PDATA line.

Once all of the bits in shift register 52 are shifted out, the SELID value is deasserted and the SELPORT (select port) signal is asserted by controller 40. The SELPORT signal is an input to shift register 54, and when asserted, activates the shifting out of the port identification value from shift register 54. The SELPORT signal is also a selection input to the MUX 42, and when asserted, selects the output of shift register 54 as the output on the PDATA line.

The controller also asserts a LOAD2 signal when the SELID value is deasserted. The LOAD2 signal is an input to shift register 58, and when asserted, activates the shifting in of the data held in statistics block 60. The statistics block includes any circuitry needed to determine other desired statistical data for tagging onto the end of a data packet. Other statistical information may include whether the packet received has a broadcast address, whether a CRC error occurred, the actual length of the data packet in bits, or any other information that would be helpful for network analysis and administration. The LOAD2 signal is preferably not asserted until the entire data packet has been transmitted.

Delay of the signal provides a suitable time period for any determinations by statistics block 60 that would not be valid until the data packet finished transmission, e.g., whether a CRC error occurred in the data packet.

Once the port identification has been shifted out of shift register 54, the controller deasserts SELPORT and asserts SELSTAT (select statistic) signal. The SELSTAT is an input into shift register 58, and when asserted, activates the shifting out of any additional statistical information generated from statistics block 60 from shift register 58. The SELSTAT signal is also a selection input into the MUX 42, and when asserted, selects the output of the shift register 58 as the output on the PDATA line.

After completion of the output of the data from shift register 58, the SELSTAT signal is deasserted by the controller 40. The controller also deasserts the CALC signal to the FCS generator circuit 48 to end the FCS signal calculation. The controller 40 then asserts a SELFCS (select FCS) signal. The SELFCS signal is an input to the FCS generator circuit 48, and when asserted, activates the FCS generator circuit 48 to output the generated FCS value serially into the MUX 42. The SELFCS signal is also a selection input to the MUX 42, and when asserted, selects the output of the FCS generator circuit 48 as the output on the PDATA line. Once the generated FCS value is completely output, the transmission of the data packet is complete. The controller 40 deasserts PENA1 and PENA2, so that the PDATA and PCLK signal are placed in a high impedance state, and the PENO signal is an open-drain signal.

Although the present invention has been described in accordance with the embodiments shown in the figures, one of ordinary skill in the art recognizes there could be variations to the embodiments and those variations would be within the spirit and scope of the present invention.

For example, the control signals for appending data to a data packet, e.g., SELID and SELPORT, have been described in a particular order. Of course, a different order could be used for output of these signals with the exception of the SELFCS signal, which is appropriately output at the end of the data packet. Also, the tagging of the fields may be programmable to suit the needs of a particular system. Suitably, a control register 62 coupled to controller 40 would be suitable to store a control signal, e.g. SELTAG (select tag), to activate or deactivate the tagging circuit as desired.

Further, although specific circuit components have been described for use and have been found by the inventors to work well in producing the packet tagging data signals, other circuit components may be used to provide the packet tagging function as set forth herein.

Additionally, as mentioned previously, a packet compression circuit could be employed with the packet tagging circuit of the present invention. Use of a compressed data packet would allow more flexibility by allowing greater transmission time than an inter-packet gap period for the added packet data. An increase in transmission time would also reduce the risk of a collision with any subsequent data packets on the network.

Further, either packet tagging and/or packet compression could be disabled based on the repeater detecting a match between the destination address of the received packet, and a stored addresses (or multiple addresses) representing the address of the management MAC. In this case, for instance, packets which are intended to be received by the management MAC can be passed either unaltered (e.g. not compressed or tagged), or tagged (uncompressed but with a tag field).

Accordingly, many modifications may be made by one of ordinary skills in the art without departing from the spirit and scope of present invention, the scope of which is defined solely by the appended claims.

We claim:

1. A method for providing statistical network information in a data packet, the method comprising the steps of:
   (a) receiving a data packet on a repeater in the network, the repeater having a plurality of ports, the data packet having a data portion;
   (b) transferring the data portion of the data packet to a management unit; and
   (c) appending statistical information to the data portion transferred to the management unit during an inter-packet gap period.

2. The method of claim 1 in which the statistical information includes a repeater identification value.

3. The method of claim 1 in which the statistical information includes a port identification value.

4. The method of claim 1 further comprising the step of generating a frame check sequence (FCS).

5. The method of claim 4 in which the statistical information includes the generated FCS sequence.

6. The method of claim 1 in which the inter-packet gap period is approx 12 bytes long.

7. The method of claim 6 in which the step of appending has a duration less than about two-thirds of the inter-packet gap period.

8. The method of claim 1 further comprising the step of providing a control signal indicative of network activity during the step of appending.

9. The method of claim 1 in which the statistical information includes packet length, whether the packet has been compressed, and/or whether the packet is a multicast or broadcast packet.

10. The method of claim 1 in which the statistical information includes whether the packet contained an FCS and/or alignment error.

11. An apparatus for providing statistical network information, the apparatus comprising:
    a repeater means having at least one port for receiving a data packet, the data packet having a data portion;
    a management unit means coupled to the repeater means for determining statistical information; and
    a packet tagging circuit coupled between the repeater means and the management unit means for appending the statistical information to the data portion during an inter-packet gap period while the data portion is received at the management unit means.

12. The apparatus of claim 11 in which the packet tagging circuit appends a repeater identification value to the data packet.

13. The apparatus of claim 11 in which the packet tagging circuit appends a port value to the data packet.

14. The apparatus of claim 11 in which the packet tagging circuit further comprises a frame check sequence (FCS) generator circuit.

15. The apparatus of claim 14 in which the FCS generator circuit generates a valid FCS value for the appended data packet.

16. The apparatus of claim 15 in which the packet tagging circuit appends the valid FCS value to the appended data packet.

17. The apparatus of claim 11 in which the packet tagging circuit further comprises a controller means.

18. The apparatus of claim 17 in which the controller means provides an enable output signal indicative of the status of the packet tagging circuit.

19. The apparatus of claim 11 in which the packet tagging circuit further comprises a start of frame delimiter (SFD) circuit.

20. The apparatus of claim 19 in which the SFD circuit identifies a SFD sequence in the data packet.

21. The apparatus of claim 11 in which the interpacket gap period is approximately 12 bytes long.

22. The apparatus of claim 21 in which the packet tagging circuit appends the information during less than approximately two-thirds of the inter-packet gap period.

23. A method for providing statistical network information in a network, the network having a plurality of repeaters, the network comprising the steps of:
    (a) receiving a data packet on one repeater of the plurality of repeaters in the network, the data packet having a data portion;
    (b) outputting a first control signal from the one repeater to a controller;
    (c) transferring the data portion of the data packet to a management unit;
    (d) appending statistical information to the data portion during an inter-packet gap period; and
    (e) outputting a second control signal from the one repeater to indicate a status of transmission activity to the controller during the steps of transferring and appending.

24. The method of claim 23 further comprising the step of receiving a second data packet at a second repeater of the plurality of repeaters.

25. The method of claim 24 further comprising the step of transmitting the second data packet to the network during the appending step of the one repeater.

26. The method of claim 25 further comprising the step of outputting the second control signal by the second repeater during the entire transmission of the second data packet.

27. The method of claim 26 in which the one repeater ignores the second data packet being transmitted by the second repeater.

28. The method of claim 23 wherein steps (b) and (c) are deactivated when a collision signal is received by at least one of the plurality of repeaters.

29. The method of claim 28 wherein the second control signal indicates transmission activity until the collision signal is no longer received by the at least one repeater.

30. A circuit for enhancing network statistical information provided in a data packet to a repeater, the repeater including a repeater front end for receiving the data packet and a management unit coupled to the repeater front end, the enhancing circuit comprising:
    a packet tagging means for appending statistical information to a data packet transmitted from the repeater front end to the management unit during an inter-packet gap period; and
    a validation means coupled to the packet tagging means for providing an indication that the appended data packet is valid.

31. The circuit for enhancing network statistical information of claim 30 in which the validation means further comprises:
    a generator means for generating a frame check sequence, the frame check sequence indicating that the appended data packet is valid.

32. The circuit for enhancing network statistical information of claim 31 in which the generator means is programmably deactivated.

33. The circuit for enhancing network statistical information of claim 30 in which the packet tagging means further comprises a controller means.

34. The circuit for enhancing network statistical information of claim 33 in which the controller means provides an enable output signal indicative of the status of the packet tagging means.

35. The circuit for enhancing network statistical information of claim 30 in which the packet tagging means further comprises a start of frame delimiter (SFD) circuit.

36. The circuit for enhancing network statistical information of claim 35 in which the SFD circuit identifies a SFD sequence in the data packet.

37. The circuit for enhancing network statistical information of claim 30 in which the inter-packet gap period is approx 12 bytes long.

38. The circuit for enhancing network statistical information of claim 30 in which the packet tagging means appends the information during approximately less than two-thirds of the inter-packet gap period.

39. The circuit for enhancing network statistical information of claim 30 in which the packet tagging means appends statistical information to a compressed data packet.

40. The circuit for enhancing network statistical information of claim 39 in which the packet tagging circuit begins appending the statistical information to the compressed data packet during a gap created by compression and prior to an inter-packet gap period.

41. The circuit for enhancing statistical information of claim 30 which includes means for address look up and matching of the destination of the packet with the physical destination address of the management MAC.

42. The circuit for enhancing statistical information of claim 30 in which only active repeater chip generates the tagging field and other data from the packet is read from an expansion bus by the management unit.

* * * * *